United States Patent
Park et al.

(10) Patent No.: US 8,384,948 B2
(45) Date of Patent: Feb. 26, 2013

(54) IMAGE FORMING APPARATUS AND METHOD USING MULTI-PROCESSOR

(75) Inventors: Soo-hee Park, Suwon-si (KR); Yoon-tae Lee, Yongin-si (KR)

(73) Assignee: Samsunsung Electronics Co., Ltd., Suwon-si (KR)

( * ) Notice: Subject to any disclaimer, the term of this patent is extended or adjusted under 35 U.S.C. 154(b) by 793 days.

(21) Appl. No.: 11/507,482

(22) Filed: Aug. 22, 2006

(65) Prior Publication Data

US 2007/0064276 A1   Mar. 22, 2007

(30) Foreign Application Priority Data

Aug. 24, 2005   (KR) .................. 10-2005-0078023

(51) Int. Cl.
  *H04N 1/40*   (2006.01)
(52) U.S. Cl. ....... 358/1.9; 358/1.15; 358/1.16; 358/1.18
(58) Field of Classification Search .................... 358/1.9, 358/448, 538, 3.06, 296, 1.6, 1.15, 1.16, 358/1.17, 1.18
  See application file for complete search history.

(56) References Cited

U.S. PATENT DOCUMENTS

| | | | |
|---|---|---|---|
| 4,803,617 A | | 2/1989 | Berarducci |
| 5,768,489 A | * | 6/1998 | Adachi et al. ................ 358/1.18 |
| 5,859,711 A | * | 1/1999 | Barry et al. .................... 358/296 |
| 5,978,553 A | * | 11/1999 | Ikeda ............................. 358/1.9 |
| 6,049,394 A | * | 4/2000 | Fukushima .................... 358/1.9 |
| 6,282,687 B1 | * | 8/2001 | Maeda et al. ................... 714/763 |
| 6,532,016 B1 | * | 3/2003 | Venkateswar et al. ........ 345/504 |
| 6,819,447 B1 | * | 11/2004 | Sawano ...................... 358/1.16 |
| 6,992,729 B2 | * | 1/2006 | Shirata et al. ................. 348/673 |
| 7,158,243 B2 | * | 1/2007 | Sakamoto et al. ............. 358/1.1 |
| 2004/0027594 A1 | * | 2/2004 | Suzuki et al. .................. 358/1.2 |
| 2004/0095603 A1 | * | 5/2004 | Lin ............................. 358/1.18 |
| 2004/0098718 A1 | * | 5/2004 | Yoshii et al. .................. 718/100 |
| 2004/0113957 A1 | * | 6/2004 | Han ................................ 347/1 |
| 2004/0243934 A1 | * | 12/2004 | Wood et al. .................... 715/517 |

FOREIGN PATENT DOCUMENTS

| | | |
|---|---|---|
| EP | 0 919 390 A2 | 6/1999 |
| JP | 05-201077 | 8/1993 |
| KR | 1997-0049389 | 7/1997 |

* cited by examiner

*Primary Examiner* — King Poon
*Assistant Examiner* — Allen H Nguyen
(74) *Attorney, Agent, or Firm* — Stanzione & Kim, LLP

(57) ABSTRACT

An image forming apparatus including a multi-processor and an image forming method thereof. The apparatus includes a data processing unit to divide input print data into a plurality of divided print data according to a predetermined criterion and to simultaneously process the plurality of divided print data using a multi-processor, and an image forming unit to form an image corresponding to the processed print data.

12 Claims, 4 Drawing Sheets

IMAGE FORMING APPARATUS AND METHOD USING MULTI-PROCESSOR

CROSS-REFERENCE TO RELATED APPLICATIONS

This application claims priority under 35 U.S.C. §119(a) from Korean Patent Application No.10-2005-0078023, filed on Aug. 24, 2005, in the Korean Intellectual Property Office, the disclosure of which is incorporated herein in its entirety by reference.

BACKGROUND OF THE INVENTION

1. Field of the Invention

The present general inventive concept relates to an image forming apparatus and method, and more particularly, to an image forming apparatus including a multi-processor to simultaneously process a plurality of print data to form an image, and an image forming method thereof.

2. Description of the Related Art

Image forming apparatuses, such as printers and multi-function peripherals (MFPs), have a print function to form an image according to input print data. A processor used in an image forming apparatus generates image data that the image forming apparatus can recognize by processing input print data, and the image forming apparatus prints the image data.

A processor used in a conventional image forming apparatus cannot simultaneously process a plurality of print data. That is, the processor must sequentially process each of the plurality of print data separately.

Thus, when a plurality of print data is to be processed, the conventional image forming apparatus spends more time to form images corresponding to input print data. For example, if input print data I contains information regarding four colors C, M, Y, and K, the processor sequentially processes print data Ic, Im, Iy, and Ik corresponding to the four colors. As a result, when the conventional image forming apparatus prints the print data I, it takes about four times longer to print the color data C as compared to the time it takes to print a single color when the input print data contains information regarding only the single color, such as only the color data C.

In addition, the processor not only processes print data, but also is involved in a general operation of an image forming apparatus. Thus, the processing load of the conventional image forming apparatus increases when more types of data have to be printed.

SUMMARY OF THE INVENTION

The present general inventive concept provides an image forming apparatus including a multi-processor to simultaneously process a plurality of print data to form an image corresponding to the processed print data.

The present general inventive concept also provides an image forming method useable with an image forming apparatus including a multi-processor to simultaneously process a plurality of print data to form an image corresponding to the processed print data.

The present general inventive concept also provides a computer readable medium having recorded thereon a computer readable program to control a multi-processor to simultaneously process a plurality of print data to process input print data and form an image corresponding to the processed print data.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus, including a data processing unit to divide input print data into a plurality of divided print data according to a predetermined criterion and to simultaneously process the plurality of divided print data using a multi-processor, and an image forming unit to form an image corresponding to the processed print data.

A number of the divided print data may be N, where N is a positive integer equal to or greater than 2, and a maximum number of print data that can be simultaneously processed by the multi-processor may be M, where M is a positive integer equal to or greater than N.

The multi-processor may be implemented as a plurality of integrated processor cores, a plurality of processors connected to a bus, or a single processor that changes a processing thread according to a given task.

The predetermined criterion is colors, sizes, or both colors and sizes.

The foregoing and/or other aspects and utilities of the present general inventive concept may also be achieved by providing an image forming method useable with an image forming apparatus including a multi-processor, the method including dividing input print data into a plurality of divided print data according to a predetermined criterion, simultaneously processing the plurality of divided print data using the multi-processor, and forming an image corresponding to the processed print data.

The foregoing and/or other aspects and utilities of the present general inventive concept may also be achieved by providing a computer readable medium having recorded thereon a computer readable program to perform an image forming method useable with an image forming apparatus including a multi-processor, the method including dividing input print data into a plurality of divided print data according to a predetermined criterion, simultaneously processing the plurality of divided print data using the multi-processor, and forming an image corresponding to the processed print data.

The foregoing and/or other aspects and utilities of the present general inventive concept may also be achieved by providing a data-processing unit useable with an image forming apparatus, including a multi-processing unit to simultaneously process a plurality of data to generate image data or command data. The data processing unit may further include an image data generator unit to generate the image data from the command data. The multi-processing unit may include at least one of a multi-core multi-processor, a pool structure multi-processor, and a multi-thread multi-processor. The multi-processing unit may be able to process a maximum amount of data that is greater than an actual amount of processed data. The maximum amount may be greater than or equal to double the actual amount. The maximum amount may be greater than or equal to ten times the actual amount.

The foregoing and/or other aspects and utilities of the present general inventive concept may also be achieved by providing an image forming apparatus, including a data processing unit comprising a multi-processing unit to simultaneously process a plurality of data to generate image data or command data, and an image forming unit to generate an image corresponding to the input data. The input data may be created by an external host connected to the image forming apparatus and input from the host to the image forming apparatus. The input data may be stored in a storage medium and input from the storage medium to the image forming apparatus. The image forming apparatus may further include a controller to control an operation of the image forming apparatus. The controller may include the data processing unit. The controller may include a memory controller to control reading from and writing to a memory unit, an interface controller to receive print data from a host connected to the image forming apparatus, a compression/decompression unit to compress image data to be stored in the memory unit and to decompress image data stored in the memory unit, and a video controller to receive the image data generated by the data processing unit and to transmit the received image data to the image forming unit. The data processing unit may further include an image data generator unit to generate the image data from the command data generated by the multi-processor unit, and the controller may further include a raster controller to control the data processing unit. The memory unit may be internal to the image forming device. The memory device may be external to the image forming device.

The foregoing and/or other aspects and utilities of the present general inventive concept may also be achieved by providing a method of generating an image, including simultaneously processing a plurality of data to generate image data or command data, and generating an image corresponding to the input data. The method may further include simultaneously processing the plurality of data to generate the image data, and generating the image corresponding to the plurality of data using the generated image data. The method may further include simultaneously processing the plurality of data to generate the command data, generating the image data from the command data, and generating the image corresponding to the input data using the generated image data.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
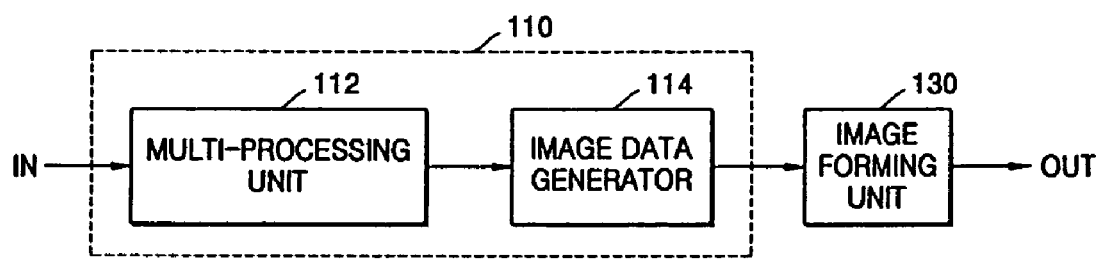
FIG. 1 is a block diagram illustrating an image forming apparatus including a multi-processor according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus including a multi-processor according to an embodiment of the present general inventive concept. The image forming apparatus may include a data processing unit 110 and an image forming unit 130. The data processing unit 110 may include a multi-processing unit 112 and an image data generator 114.

The image forming apparatus may be, for example, a printer or a multi-function peripheral (MFP).

Reference character "IN" denotes input print data. The input print data may be input into the image forming apparatus page-by-page. However, the present general inventive concept is not limited to inputting the input print data page-by-page. The input print data can contain, for example, information regarding a single color or information regarding a plurality of colors such as cyan (C), magenta (M), yellow (Y), and black (K).

The input print data can be created by a host connected to the image forming apparatus and transmitted from the host. The print data can also be stored in a storage medium and input directly to the image forming apparatus from the storage medium.

Reference character "OUT" denotes a formed image corresponding to the input print data. The formed image may, for example, include a printing medium on which the formed image corresponding to the input print data is printed.

The multi-processing unit 112 of the data processing unit 110 includes a multi-processor to simultaneously process a plurality of print data. The multi-processing unit 112 may also divide the input print data according to a criterion and process the divided print data using the multi-processor.

In various embodiments, the number of the divided print data actually processed by the multi-processor may be N (where N is a positive integer equal to or greater than 2), and the maximum number of print data that can be simultaneously processed by the multi-processor may be M (where M is a positive integer equal to or greater than N). That is, the maximum number of print data that can be simultaneously processed by the multi-processor may be greater than the actual number of print data simultaneously processed by the multi-processor. In other words, the multi-processor may have a capacity to process more print data than is actually processed by the image forming apparatus. For example, when the number of print data is N (where N is a positive integer greater than or equal to 2), the maximum number of print data that can be simultaneously processed by the multi-processor may be N+1. Further, the maximum number of print data that can be simultaneously processed by the multi-processor may be a multiple of N. Still further, the maximum number of print data that can be simultaneously processed by the multi-processor may be 2N, 10N, or 100N. In addition, the maximum number of print data that can be simultaneously processed by the multi-processor may be in a range of about N+1 to about 100N, or about 2N to about 10N, or about 2N to about 100N, or about 10N to about 100N.

The criterion by which the multi-processing unit 112 divides the input print data may be a predetermined criterion. For example, the multi-processing unit 112 can divide the input print data based on such predetermined criterion as colors, sizes, or both colors and sizes.

If color information of the input print data is information regarding a single color, the multi-processing unit 112 can divide the input print data based on sizes. Each print data divided based on sizes can be called a band. For example, if the input print data is print data corresponding to one page, the color information of the input print data is information regarding a single color, and the total size of the input print data is 100, then the input print data can be divided into 50 bands each having a size of 2.

If the input print data contains information regarding multiple colors, such as, C, M, Y, and K, the multi-processing unit 112 can divide the input print data into print data corresponding to color C, print data corresponding to color M, print data corresponding to color Y, and print data corresponding to color K. In this case, the multi-processing unit 112 can divide each of the divided print data into a plurality of bands based on color. For example, the multi-processing unit 112 can divide the print data corresponding to M into a plurality of bands.

If the number of the plurality of print data divided by the multi-processing unit 112 is N (where N is a positive integer greater than or equal to 2), the multi-processing unit 112 can generate N image data or N command data by simultaneously processing the N print data using the multi-processor.

In order for the image forming apparatus to print data, an image representing the print data must be recognized by the image forming apparatus. Thus, data having a pattern that the image forming apparatus can recognize is the image data. For example, bitmap pattern data is a non-limiting example of image data having a pattern that the image forming apparatus can recognize.

As described above, a processing result in the image forming apparatus can be image data or command data. The command data is print data having a command pattern. Since the image forming apparatus cannot recognize the command data, if command data is generated as the multi-processing unit 112 processes the print data, the data processing unit 110 may include an image data generator 114. The image data generator 114 of the data processing unit 110 generates image data corresponding to the generated command data. However, if image data (as opposed to command data) is generated as the multi-processing unit 112 processes the print data, the data processing unit 110 does not need to use the image data generator 114.

The image forming unit 130 can then form an image corresponding to the print data processed by the data processing unit 110. For example, the image forming unit 130 prints image data generated by the data processing unit 110.

Figure 2:
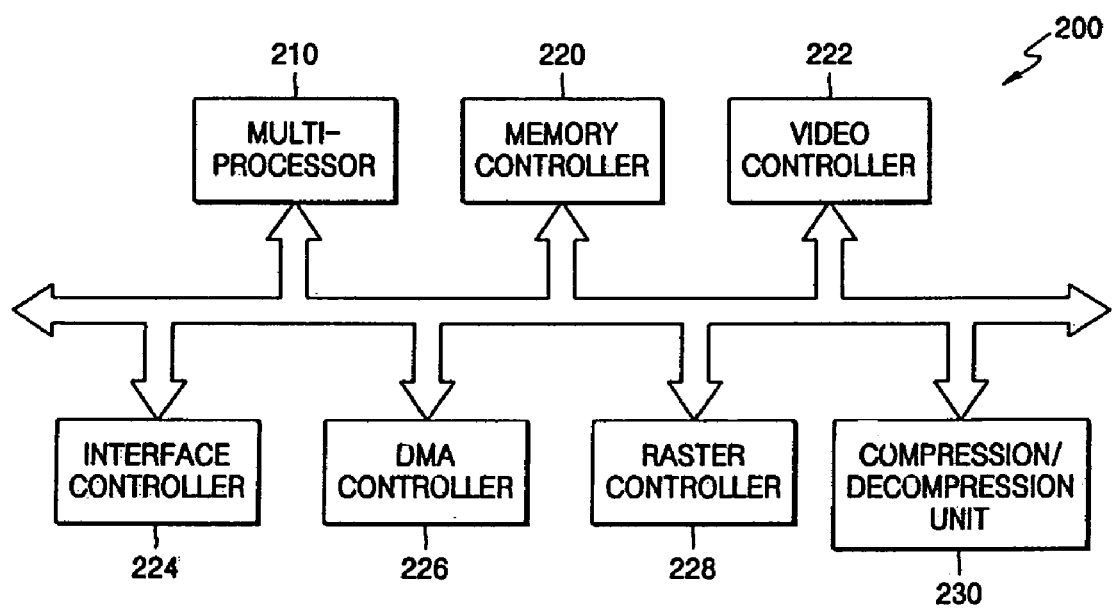
FIG. 2 is a block diagram illustrating a controller included in an image forming apparatus including a multi-processor according to an embodiment of the present general inventive concept.

FIG. 2 is a block diagram illustrating a controller 200 included in an image forming apparatus and having a multi-processor according to an embodiment of the present general inventive concept. Referring to FIG. 2, the controller 200 controls an operation of the image forming apparatus and can include a multi-processor 210, a memory controller 220, a video controller 222, an interface controller 224, a direct memory access (DMA) controller 226, a raster controller 228, and a compression/decompression unit 230.

All components of the controller 200 may be connected to each other via a bus. In various embodiments, the bus can be prepared as a single layer bus or as a multi-layer bus. The type of bus can vary as long as the bus is suitable to connect the components of the controller 200 to each other.

The multi-processor 210 processes print data, participates in general operations of a memory controller 220 through a compression/decompression unit 230, and commands the image forming unit 130 to operate.

The memory controller 220 controls reading an/or writing from and/or to a memory located inside or outside of the image forming apparatus controller 200. The video controller 222 receives image data generated by the data processing unit 110 and transmits the received image data to the image forming unit 130.

The interface controller 224 receives print data and/or a print command from the host connected to the image forming apparatus. The DMA controller 226 may be used when high-speed transmission between an external device and the image forming apparatus is desired. The raster controller 228 corresponds to the above-described image data generator 114 to control the generation of image data corresponding to command data when command data is generated as the multi-processing unit 112 processes the print data. The compression/decompression unit 230 compresses image data to be stored in the memory placed inside or outside the image forming apparatus controller 200 and decompresses image data stored in the memory.

Figure 3A:
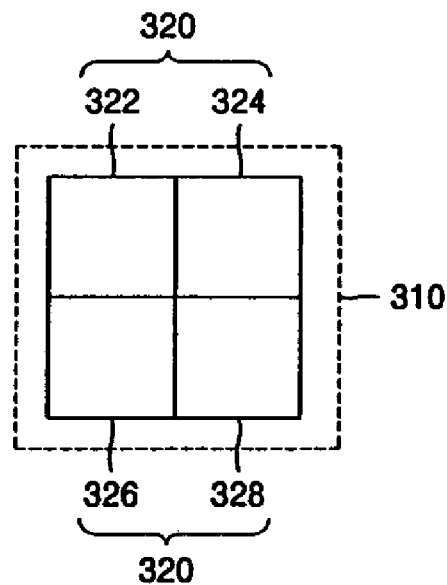
FIGS. 3A and 3B are reference diagrams illustrating examples of multi-processors according to embodiments of the present general inventive concept.
Figure 3B:
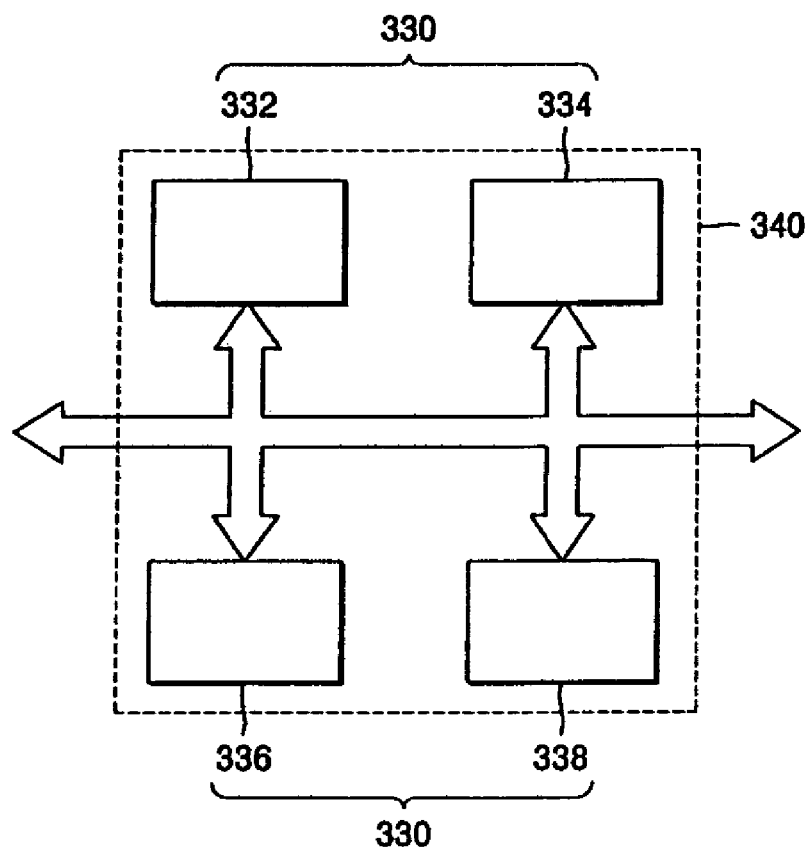

FIGS. 3A and 3B are reference diagrams illustrating examples of multi-processors according to embodiments of the present general inventive concept.

The multi-processor 210 included in the multi-processing unit 112 of the data processing unit 110 may be implemented in various ways. For example, in various embodiments, a multi-processor 310 (illustrated in FIG. 3A) can be implemented by integrating a plurality of processor cores 322, 324, 326, and 328. A single processor core 320 can process single print data. The multi-processor 310 illustrated in FIG. 3A can be called a multi-core multi-processor. In various other embodiments, a multi-processor 340 (illustrated in FIG. 3B) can be implemented with a plurality of processors 332, 334, 336, and 338 connected to a bus. Each processor 330 can include at least one processor core. The multi-processor 340 illustrated in FIG. 3B can be called a pool structure multi-processor. In various other embodiments, the multi-processor can be implemented with a single processor that changes a processing thread according to a given task. This multi-processor can be called a multi-thread multi-processor. In various other embodiments, the multi-processor can be implemented by combining one or more of a multi-core multi-processor, a pool structure multi-processor, and a multi-thread multi-processor.

Figure 4:
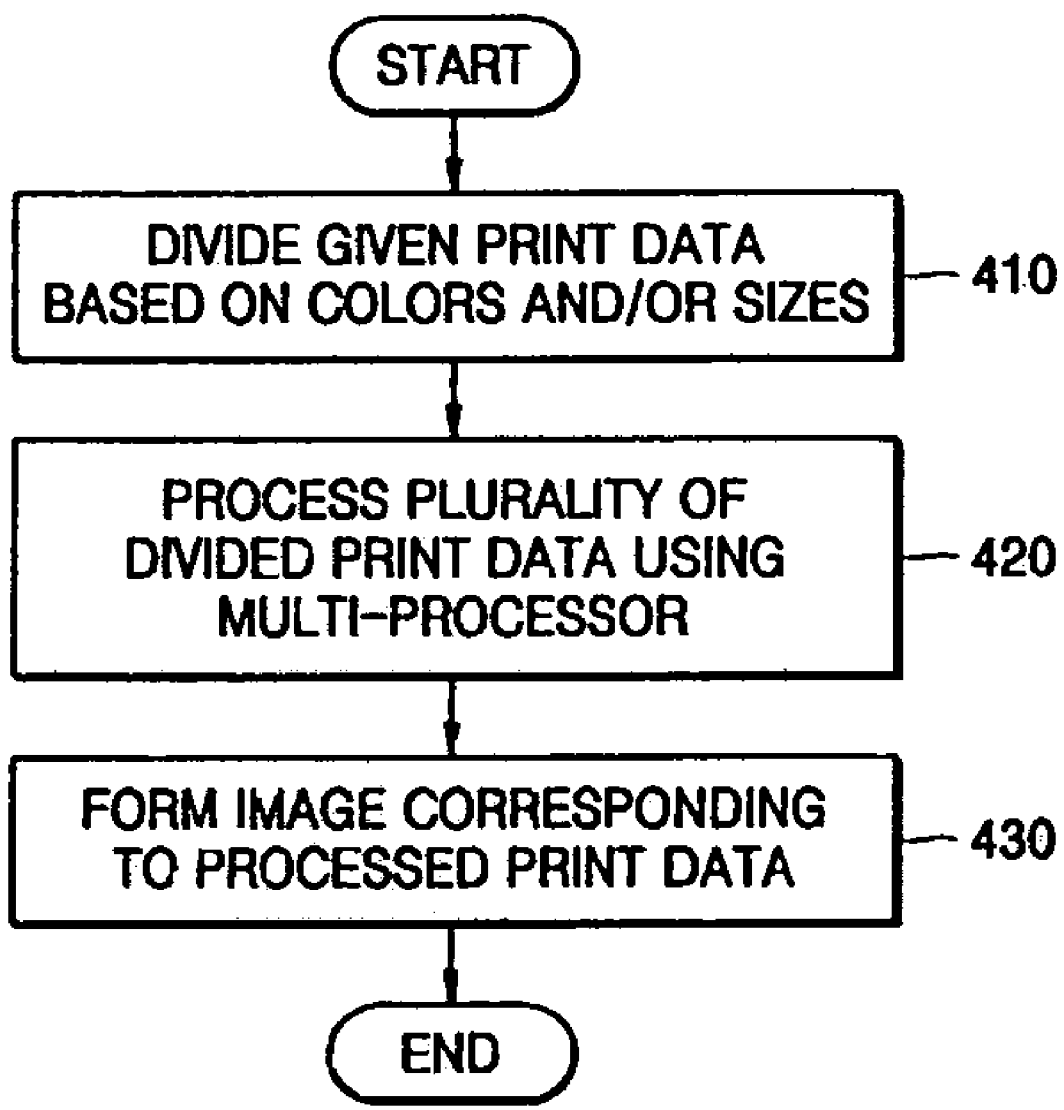
FIG. 4 is a flowchart illustrating an image forming method useable with an image forming apparatus including a multi-processor according to an embodiment of the present general inventive concept.

FIG. 4 is a flowchart illustrating an image forming method useable with an image forming apparatus including a multi-processor according to an embodiment of the present general inventive concept. The image forming method of FIG. 4 includes operations 410 through 430 to process input print data using a multi-processor to simultaneously process a plurality of print data, and to form an image corresponding to the processed print data.

Referring to FIGS. 1 and 4, in operation 410, the data processing unit 110 divides input print data based on color and/or size. In operation 420, a multi-processor included in the data processing unit 110 generates a plurality of image data by processing the plurality of divided print data. In operation 430, the image forming unit 130 forms an image corresponding to the generated image data.

Figure 5:
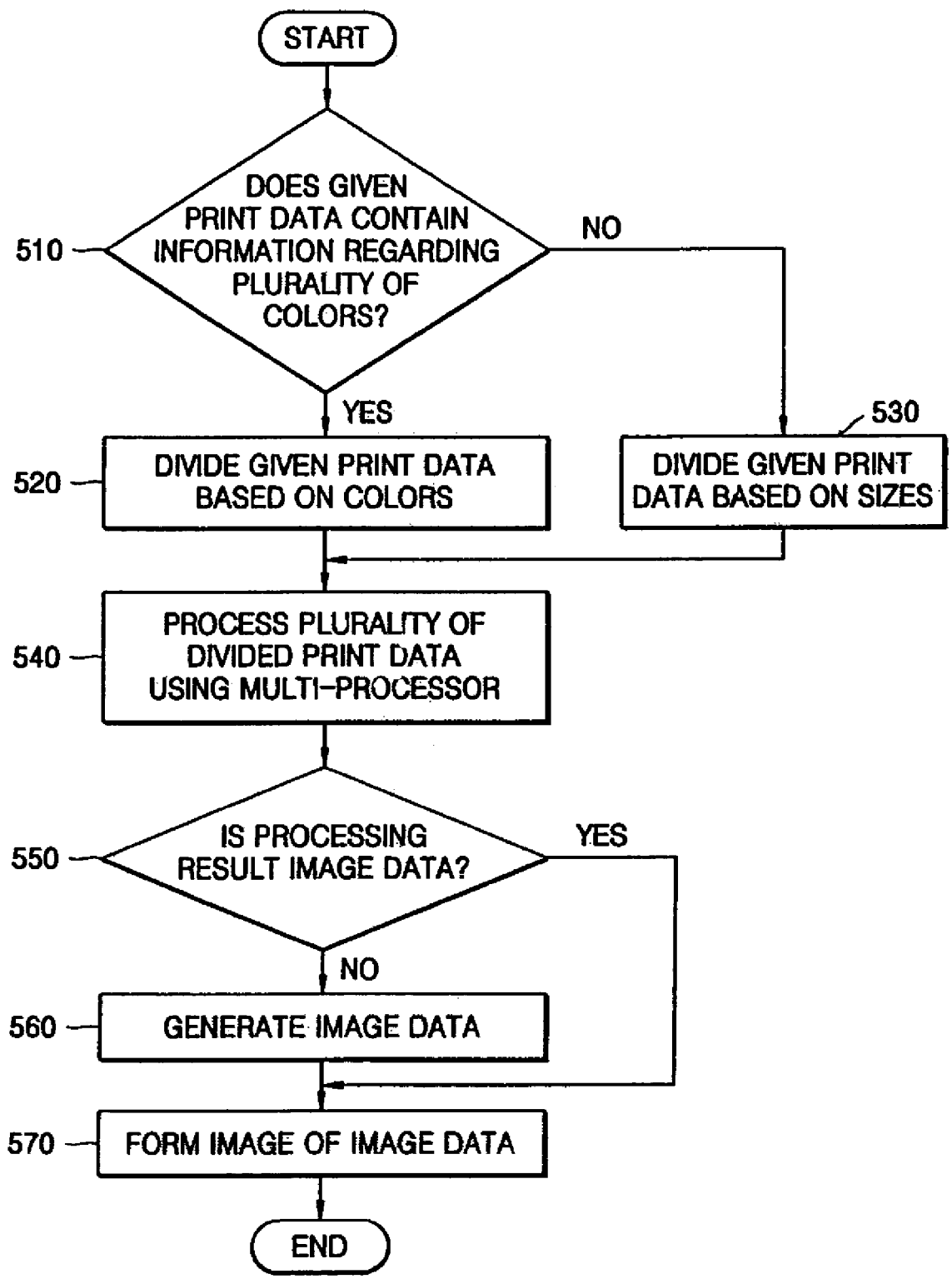
FIG. 5 is a flowchart illustrating an image forming method useable with an image forming apparatus including a multi-processor according to another embodiment of the present general inventive concept.

FIG. 5 is a flowchart illustrating an image forming method useable with an image forming apparatus including a multi-processor according to another embodiment of the present general inventive concept. The image forming method of FIG. 5 includes operations 510 through 570 to process input print data using a multi-processor to simultaneously process a plurality of print data, and to form an image corresponding to the processed print data.

Referring to FIGS. 1 and 5, in operation 510, an inspection unit (not illustrated) included in the image forming apparatus that includes the multi-processor determines whether the input print data contains information regarding a plurality of colors. If it is determined in operation 510 that the input print data contains information regarding a plurality of colors, the data processing unit 110 divides the input print data based on the plurality of colors in operation 520. However, if it is determined in operation 510 that the input print data contains information regarding a single color, the data processing unit 110 divides the input print data based on sizes in operation 530. In operation 540, the multi-processor included in the data processing unit 110 processes the plurality of divided print data. In operation 550, the data processing unit 110 determines whether command data or image data is generated as a processing result of operation 540. If it is determined in operation 550 that command data is generated, the image data generator 114 generates image data corresponding to the command data in operation 560, and the image forming unit 130 prints the generated image data in operation 570. If, however, it is determined in operation 550 that image data (and not command data) is generated, then the process moves to operation 570 without performing operation 560.

The present general inventive concept may be embodied in a general-purpose computer by running a program from a computer-readable medium, including, but not limited to, storage media, such as magnetic storage media (ROMs, RAMs, floppy disks, magnetic tapes, etc.), and optically-readable media (CD-ROMs, DVDs, etc.). The functional programs, codes and code segments for embodying the present general inventive concept may be easily construed by programmers in the art in which the present general inventive concept belongs.

As described above, in an image forming apparatus including a multi-processor and an image forming method thereof according to various embodiments of the present general inventive concept, since input print data can be processed using the multi-processor to simultaneously process a plurality of print data, even if the plurality of print data to be processed is a large number of print data, an image corresponding to the input print data can be processed without delay.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   a data processing unit to determine whether input print data originally contains information regarding a plurality of colors including C, M, Y and K, to divide the input print data that comprises the plurality of colors including C, M, Y and K into a plurality of divided print data corresponding to color C, color M, color Y and color K based on colors if it is determined that the input print data originally contains the information regarding the plurality of colors, to divide the input print data into a plurality of divided print data based on sizes if it is determined that the input print data originally contains information regarding a single color, and to simultaneously process the plurality of divided print data using a multi-processor; and
   an image forming unit to form an image corresponding to the processed print data.

2. The apparatus of claim 1, wherein:
   a number of the divided print data is N, where N is a positive integer equal to or greater than 2, and
   a maximum number of print data that can be simultaneously processed by the multi-processor is M, where M is a positive integer equal to or greater than N.

3. The apparatus of claim 1, wherein the multi-processor is implemented as:
   a plurality of integrated processor cores,
   a plurality of processors connected to a bus, or
   a single processor that changes a processing thread according to a given task.

4. The apparatus of claim 1, wherein;
   the data processing unit generates image data by processing the plurality of divided print data; and
   the image forming unit forms an image corresponding to the generated image data.

5. The apparatus of claim 1, wherein the data processing unit comprises:
   a multi-processing unit to divide the input print data into print data corresponding to color C, color M, color Y and color K if it is determined that the input print data originally contains information regarding the plurality of colors, to divide the input print data into a plurality of divided print data based on sizes if the input print data originally contains information regarding a single color, and to process the plurality of divided print data using the multi-processor to generate a command pattern; and
   an image data generator to generate image data to correspond to the command pattern.

6. The apparatus of claim 1, wherein the data processing unit generates command data or image data from the processed print data and further comprises:
   an image data generator to generate image data from the command data when command data is generated,
   wherein the image forming unit forms an image corresponding to the generated image data.

7. The apparatus of claim 1, wherein when it is determined that the input data does not originally contain the information regarding the plurality of colors, the input data originally contains the information regarding the single color.

8. An image forming method useable with an image forming apparatus including a multi-processor, the method comprising:
   determining whether input print data originally contains information regarding a plurality of colors including C, M, Y and K;
   dividing the input print data into a plurality of divided print data corresponding to color C, color M, color Y and color K based on colors if it is determined that the input print data originally contains information regarding the plurality of colors;
   dividing the input print data into a plurality of divided print data based on sizes if it is determined that the input print data does not originally contain information regarding the plurality of colors;
   simultaneously processing the plurality of divided print data using the multi-processor; and
   forming an image corresponding to the processed print data,
   wherein the predetermined criterion is colors, sizes, or both colors and sizes.

9. The method of claim 8, wherein:
   a number of the divided print data is N, where N is a positive integer equal to or greater than 2, and
   a maximum number of print data that can be simultaneously processed by the multi- processor is M, where M is a positive integer equal to or greater than N.

10. The method of claim 8, wherein the multi-processor is implemented as:
    a plurality of integrated processor cores,
    a plurality of processors connected to a bus, or a single processor that changes a processing thread according to a given task.

11. The method of claim 8, further comprising:
generating command data or image data from the processed print data;
generating image data from the command data when command data is generated; and
forming an image corresponding to the generated image data.

12. A non-transitory computer readable medium having recorded thereon a computer readable program to perform an image forming method useable with an image forming apparatus including a multi-processor, the method comprising:
determining whether input print data contains information regarding a plurality of colors including C, M, Y and K;
dividing the input print data into a plurality of divided print data corresponding to color C, color M, color Y and color K based on colors if it is determined that the input print data contains information regarding the plurality of colors;
dividing the input print data into a plurality of divided print data based on sizes if it is determined that the input print data does not contain information regarding the plurality of colors;
simultaneously processing the plurality of divided print data using the multi-processor; and
forming an image corresponding to the processed print data,
wherein the predetermined criterion is colors, sizes, or both colors and sizes.

* * * * *